United States Patent Office 3,784,503
Patented Jan. 8, 1974

3,784,503
URETHANE COATING BASED ON A SUBSTITUTED
ISOCYANURATE-LACTONE ADDITION PRODUCT
John E. Pregler, Wallingford, Conn., assignor to Olin
Corporation, New Haven, Conn.
No Drawing. Filed Mar. 8, 1972, Ser. No. 232,918
Int. Cl. C08g 22/06, 51/28
U.S. Cl. 260—33.6 UB         10 Claims

ABSTRACT OF THE DISCLOSURE

This invention relates to urethane coating compositions, comprising as a cross-linking agent, an addition product of a substituted isocyanurate with a lactone.

---

This invention relates to novel urethane coating compositions which are prepared by the reaction of urethane resins with certain addition products of substituted isocyanurates.

Compositions comprising the reaction of aromatic isocyanates with isocyanurates are known to form useful coatings. Thus U.S. Pat. 3,174,950 discloses the use of tris-(2-hydroxyethyl)isocyanurate as a cross-linking agent in making urethane coatings for metal surfaces. Coating materials have also been prepared from the reaction of tris(2-hydroxyethyl)isocyanurate with teraphthalic and isophthalic acids and isocyanates. These systems employ a blocking agent to prevent the reaction of the diisocyanate with the polyol until thermally activated.

However, although otherwise highly desirable, the utility of isocyanurates as cross-linking agents for urethanes has not been fully exploited commercially. This is due to the insolubility or poor solubility of isocyanurates in the normal solvents used with urethane resins. This in turn has necessitated using special, highly volatile solvents, for example, dioxane and tetrahydrofuran. There are several disadvantages connected with the use of such solvents. Thus along with their relative high cost, as compared with normal urethane solvents, their use is often accompanied by undesirable gel formation in the coating. Furthermore, their high volatility makes it difficult to impart a uniform, well-adherent coating to a substrate by spraying. Still further the use of many such solvents does not comply with recently enacted air anti-pollution laws.

Now, according to this invention, novel urethane coating compositions have been found which are prepared from a composition comprising an isocyanate-terminated urethane prepolymer, an inert organic solvent, and, as cross-linking agents, certain addition products of a substituted isocyanurate and a lactone. These isocyanurate-lactone addition products are soluble in a wide variety of solvents normally used with urethane resin systems. This makes practicable their utliity in preparing urethane coatings which are free of the drawbacks of the prior art.

The urethane prepolymer is prepared by methods well-known to the art wherein, for example, an organic polyisocyanate is reacted with a polyhydroxy compound. Any suitable organic polyisocyanate may be employed including aromatic polyisocyanates such as toluene diisocyanate and phenylene diisocyanate, aliphatic polyisocyanates such as ethylene diisocyanate and methylene bis(cyclohexyliso-cyanate), and polymeric polyisocyanates such as the polyphenylene polymethylene polyisocyanates. However, the organic diisocyanates, such as toluene diisocyanate, are usually preferred.

Any suitable polyhydroxy compound or mixture of polyhydroxy compounds may be employed in preparing the urethane prepolymer. Typical examples include glycerol, castor oil, ethylene glycol, propylene glycol, 1,4-butanediol, diethylene glycol, dipropylene glycol, neopentyl glycol, triethylene glycol, hexamethylene glycol, hexanetriol, 2-butene-1,4-diol, 2-butyne-1,4-diol, butanetriol, polycaprolactones. In addition, polyether polyols may be employed. Usually these have a molecular weight of about 800–6,000 and they are prepared by catalytically reacting an alkylene oxide, such as propylene oxide, with a polyol initiators such as glycerin. Illustrative such polyethers include, for example, the oxypropylated glycerins, the polyoxyethylene glycols, the polytetramethylene glycols, and the like.

As is well known in the art, in the preparation of the isocyanate-terminated urethane prepolymer, the organic polyisocyanate is employed in an amount which is in excess of the amount that is stoichiometrically required to react with the polyhydroxy compound. Thus excesses resulting in an NCO:OH ratio of up to 2.5:1 are usually employed.

The substituted isocyanurates used in preparing the addition products which are employed in making the coating compositions of this invention are represented by Formula I as follows:

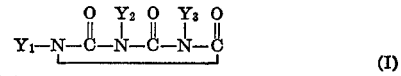

$$Y_1-N-\overset{O}{\overset{\|}{C}}-\overset{Y_2}{\overset{|}{N}}-\overset{O}{\overset{\|}{C}}-\overset{Y_3}{\overset{|}{N}}-\overset{O}{\overset{\|}{C}}$$ (I)

wherein each of $Y_1$, $Y_2$ and $Y_3$ is independently selected from the group consisting of an alkyl group containing 1 to 12 carbon atoms and terminally substituted by an OH, SH, or $NH_2$ group; a cycloalkyl group containing 6 to 20 carbon atoms and having at least one substituent selected from an OH, SH or $NH_2$ group; and an aryl group containing 6 to 20 carbon atoms and having at least one substituent selected from an OH, SH, or $NH_2$ group.

Illustrative examples of the substituted isocyanurates represented by Formula I include:

tris(2-hydroxyethyl)isocyanurate
tris(2-thioethyl)isocyanurate
tris(3-hydroxypropyl)isocyanurate
tris(3-aminopropyl)isocyanurate
1-(3-aminopropyl)-3,5-bis(3-hydroxypropyl)isocyanurate
1,3-bis(4-hydroxybutyl)-5-(4-thiobutyl)isocyanurate
1-(3-aminopropyl)-3,5-bis(2-hydroxyethyl)isocyanurate
1,3-bis(hydroxyphenyl)-5-(thiophenyl)isocyanurate
tris(4-hydroxybutyl)isocyanurate
tris(8-hydroxyoctyl)isocyanurate
tris(hydroxyphenyl)isocyanurate
tris(aminobenzyl)isocyanurate
tris(thiotolyl)isocyanurate
tris(aminocyclohexyl)isocyanurate
tris(6-hydroxyhexyl)isocyanurate
tris(4-thiobutyl)isocyanurate
tris(3,5-ditert-butyl-4-hydroxyphenyl)isocyanurate Although any of the substituted isocyanurates represented by Formula I may be employed, it is preferred to use isocyanurates wherein each of $Y_1$, $Y_2$ and $Y_3$ is independently an alkyl group containing 1 to 8 carbon atoms and terminally substituted with OH, SH, or $NH_2$, the OH group being a particularly preferred terminal substituent.

Illustrative examples of the preferred isocyanurates include:

tris(hydroxymethyl)isocyanurate
tris(2-hydroxyethyl)isocyanurate
tris(2-thioethyl)isocyanurate
tris(3-hydroxypropyl)isocyanurate
tris(3-aminopropyl)isocyanurate
1-(3-aminopropyl)3,5-bis(3-hydroxypropyl)isocyanurate
1,3-bis(4-hydroxybutyl)-5-(4-thiobutyl)-isocyanurate
1-(3-aminopropyl)3,5-bis(2-hydroxyethyl)isocyanurate
tris(4-hydroxybutyl)isocyanurate
tris(4-thiobutyl)isocyanurate
tris(5-aminopentyl)isocyanurate
tris(6-hydroxyhexyl)isocyanurate
tris(7-hydroxyheptyl)isocyanurate
tris(8-hydroxyoctyl)isocyanurate In the most preferred addition products used in the coating composition of this invention, the substituted isocyanurates of Formula I are employed in which each of $Y_1$, $Y_2$ and $Y_3$ is independently an akyl group containing 1 to 4 carbon atoms and terminally substituted with an OH group. Illustrative examples include tris(hydroxymethyl)-, tris(2 - hydroxyethyl)-, tris(3-hydroxypropyl)-, and tris(4-hydroxybutyl) isocyanurate.

A large variety of lactones can be used in preparing the addition products for use in the coating compositions of this invention. These lactones are represented by Formula II as follows:

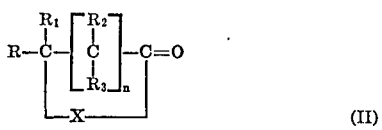

where each of R, $R_1$, $R_2$ and $R_3$ is independently selected from the group consisting of:

hydrogen,
alkyl groups containing 1 to 12 carbon atoms,
cycloalkyl groups containing 3 to 12 carbon atoms,
aralkyl groups containing 7 to 17 carbon atoms, and
aryl groups containing 6 to 14 carbon atoms, X is oxygen or sulfur, and
n is an integer from 1 to 9.

Illustrative lactones represented by Formula II include:

β-propiolactone
α,α-diphenyl-β-propiolactone
β,β-dimethyl-β-propiothiolactone
β- and γ-butyrolactone
β- and γ-butyrothiolactone
γ-methyl-γ-phenylbutylrolactone
δ- and γ-valerolactone
β-methyl-β-ethyl-γ-butyrothiolactone
δ- and γ-valerothiolactone
γ-vinyl-γ-valerolactone
β,β-diethyl-δ-valerolactone
α,α,δ,δ-tetramethyl-ε-thiocaprolactone
α,α,γ,δ,δ-pentamethyl-ε-thiocaprolactone
γ-, δ-, and ε-caprolactone
γ-, δ-, and ε-caprothiolactone
methyl caprolactone
α,-butyl-ε-caprolactone
α-octyl-ε-caprolactone
methylthiocaprolactone
γ-pimelolactone
γ-caprolactone
γ-decalactone
β-isocaprolactone Although any of the lactones represented by Formula II may be employed in preparing the addition products utilized according to this invention, it is preferred to employ those lactones in which each of R, $R_1$, $R_2$ and $R_3$ is independently hydrogen or an alkyl group having 1 to 8 carbon atoms and n is an integer from 1 to 6.

Illustrative of the preferred lactones are:

β-propiolactone
β,β-dimethyl-β-propiothiolactone
β- and γ-butyrolactone
β- and γ-butyrothiolactone
β-methyl-β-ethyl-γ-butyrothiolactone
δ- and γ-valerolactone
δ- and γ-valerothiolactone
β,β-diethyl-δ-valerolactone
γ-, δ- and ε-caprolactone
α-butyl-ε-caprolactone
α-octyl-ε-caprolactone
methylthiocaprolactone
γ-pimelolactone
γ-caprylolactone β-isocaprolactone
γ-δ- and ε-caprothiolactone
α,α,δ,δ-tetramethyl-ε-thiocaprolactone
α,α,γ,δ,δ-pentamethyl-ε-thiocaprolactone The lactones of Formula II in which X is oxygen are particularly preferred. These include for example propiolactone, butyrolactone, valerolactone, diethyl valerolactone, caprolactone, methyl caprolactone, butyl caprolactone, and pimelolactone.

The substituted isocyanurate-lactone addition products used according to the invention are generally prepared by catalytically reacting at least one mole of a lactone of Formula II per each mole of substituted isocyanurate, the reaction being carried out at elevated temperatures. A more detailed process for the preparation of these addition products is provided in U.S. application Ser. No. 232,899, filed Mar. 8, 1972, entitled "Isocyanurate Addition Products with Lactones," which is filed concurrently herewith. The entire disclosure of that application is incorporated by reference herein.

The reaction between the substituted isocyanurate and the lactone is carried out using any suitable molar ratio of reactants. Usually, however, at least one mole of lactone is employed per mole of substituted isocyanurate. Thus from 1 to about 45 moles, and preferably from about 1.5 to about 12 moles, of lactone are employed per each mole of substituted isocyanurate.

Any suitable catalyst which is effective in promoting the addition reaction between the isocyanurate and the lactone may be used. The preferred catalysts, however, are acid catalysts of which sulfuric acid and boron trifluoride are illustrative. These catalysts are employed in any suitable catalytic proportion such as from about 0.05 to about 4% and preferably about 0.3–1.5%, by weight based on the aggregate weight of the substituted isocyanurate and the lactone.

The reaction between the isocyanurate and the lactone is carried out at elevated temperatures, for example about 50–200° C., and preferably about 60–130° C.

Although the reaction between the isocyanurate and the lactone proceeds in the absence of a solvent, in some applications it may be desirable to effect the reaction in a solvent medium. When it is desired to use a solvent, a variety of solvents or mixtures thereof may be employed, provided they are inert and do not interfere with the addition reaction. Illustrative groups of suitable solvents include ketones, esters, and hydrocarbon solvents.

Any convenient order of mixing the lactone and the isocyanurate together and effecting the reaction may be employed. For example, the desired proportions of reactants and catalysts may be simultaneously placed in a reaction vessel. The mixture is then heated with agitation until such time, usually 1–4 hours, as the reaction is complete. The addition product, which is usually a viscous, homogeneous liquid, may then be dissolved in an appropriate solvent to enable neutralizing the catalyst, the solvent being thereafter stripped off.

The substituted isocyanurate-lactone addition product can be employed in any proportion which is effective in cross-linking the urethane prepolymer, provided the ratio of NCO groups to total OH groups in the coating composition is not less than 1.1:1 and not more than 2.2:1. Preferably such a proportion of addition product is employed as to provide in the urethane coating composition a ratio of NCO:total OH ranging from about 1.2:1 to about 2.0:1.

As indicated earlier, the substituted isocyanurate-lactone addition products employed according to the invention are soluble in a wide variety of solvents. Thus in utilizing these addition products as cross-linking agents for use according to the invention, one is not limited to any particular solvent or group of solvents. Rather ample latitude is afforded the practitioner in selecting a suitable, economical solvent which would meet the requirements of the particular application and the use of which would not violate the anti-pollution laws. The broad classes of solvents which can be used include hydrocarbon solvents, including the halogenated hydrocarbons, esters, ethers, ketones, amides and nitriles. Typical examples of specific solvents include: butyl acetate, Cellosolve acetate, ethylacetate, benzene, toluene, xylene, diethyl glycol dimethyl ether, methyl ethyl ketone, methyl isobutyl ketone, 1,5-pentanedione, cyclohexanone, tetrahydrofuran, cyclohexane, trichloroethane, dioxane, nitrobenzene acetonitrile and dimethylsulfoxide.

Any suitable proportion of solvent or solvent mixture can be employed in preparing the coating composition of the invention such as about 10–80%, and preferably about 20–60%, based on the total weight of reactants used in preparing the coating composition.

Preparation of the coatings of this invention may be carried out by reacting together the polyhydroxy compound, the substituted isocyanurate-lactone addition product and the organic polyisocyanate in the presence of the inert solvent. The reaction is carried out at temperatures usually in the range of about 20° to about 150° C., and preferably about 50° to about 90° C.

Any convenient order of mixing the reactants and effecting the reaction may be employed. For example, the desired proportions of reactants may be simultaneously placed in a reaction vessel. The mixture is then heated with agitation until such time, usually 8–16 hours, as the reaction is complete. This is preferably carried out in the absence of moisture in order to avoid premature curing of the reaction product. The percent of isocyanate is monitored to determine completion of the reaction. At the end of the reaction, only the excess isocyanate added should remain free. The liquid product can then be applied as a coating to a variety of substrates such as wood, plastic or metal substrates. Any suitable means of application can be used such as a spray gun or a paint roller or brush. After being applied to a surface, the coating cures at room temperature in an atmosphere containing moisture. Optionally elevated temperatures may be employed to speed up the curing.

The coating compositions of the invention, being formulated in a normal urethane soluvent, are relatively economical and easy to prepare and apply to a substrate. In common with conventional polyurethane coatings, they possess a wide range of mechanical properties generally associated with such coatings. In addition, by virtue of the isocyanurate-lactone adduct cross-linking agent, they are characterized by an outstanding low temperature flexibility and improved resistance to thermal aging, weathering and ultraviolet light. This combination of properties makes the coating compositions of the invention particularly useful in providing protective surfaces and films for aircrafts.

The following examples are provided to illustrate the invention.

EXAMPLE 1

The basic apparatus used in the following examples comprises a 3-necked glass reactor equipped with a water cooled West condenser, stirrer, thermometer and nitrogen purge. In addition, in this example a Dean-Stark trap was employed.

The reactor was charged with 100 g. (0.1608 equavalents) polycaprolactone having an average molecular weight of about 1250, a hydroxyl number of about 90 and being formed by the reaction of episilon-caprolactone and a diol, (Union Carbide D–540), 23.12 g. tris(2 - hydroxyethyl)isocyanurate-caprolactone addition product having an OH equivalent of 0.115, and 143.6 g. of a solvent mixture of xylene (75% by weight) and Cellosolve acetate (25% by weight). All of the above materials were soluble, resulting in a clear solution. The solution was azeotroped to remove excess water. When no further water build up occurred in the Dean-Stark trap, the reaction was cooled to 30° C. and 30.0 g. (0.357 equivalents) toluene diisocyanate (80/20 mixture of 2,4 and 2,6 isomers) over a five-minute period. The mixture was then heated to 80° C. for 16 hours. No gel formation occurred. The prepolymer formed was analyzed for free NCO content. This was found to be 2.3% compared with a theoretical content of 1.6%.

Coatings from the prepolymer were prepared and tested as described below. The results of the tests are provided in Table I, following Example 2.

Bright coke tin panels 6″ x 12″ x 20 mils. were cleaned with trichloroethylene and films applied with a doctor blade. After curing at room temperature for 72 hours, the free films are removed by amalgamation with mercury.

Tensile strength and elongation were measured on an Instron Tester Model TM (Instron Corp., Canton, Mass.) using the free films as prepared above and cut into ¼″ neck by 3″ dumbbells as described in ASTM–D–638–641.

Mandrel —65° F. flexibility test coatings were applied on 3″ x 6″ x .020″ anodized aluminum panels. Before coating, the panels were cleaned of oil and grease by washing with trichloroethylene. The coatings were then applied to the panels with a 6 mils. doctor blade. The coated aluminum panels and the ⅛-inch Conical Mandrel were cooled to —65° F. by placing them in a well-insulated box containing a small fan and a large amount of Dry Ice. The samples were allowed to remain in the box until the internal temperature was stabilized at —65° F. for one hour. Flexibility was measured by bending the panel around the mandrel at a uniform rate so as to bend the test specimen approximately 180° in about 15 seconds. The bent area was examined under an 8-power microscope for cracks. A sample is passed if no cracks were visible.

COMPARATIVE TEST

Example 1 was repeated with the exception that 10 g. (0.115 OH equivalents) tris(2-hydroxyethyl)isocyanurate were used in place of the tris(2 - hydroxyethyl)isocyanurate-caprolactone addition product. At the end of the reaction period, the product was a solid gel which could not be dissolved in additional solvent to give a prepolymer suitable in forming a coating. The reaction product was discarded.

EXAMPLE 2

To the reactor was added 51.6 g. (0.382 equivalents) methylene bis(cyclohexylisocyanate), 26.7 g. (0.098 OH equivalents) tris(2 - hydroxyethyl)isocyanurate addition product with caprolactone, 66.6 g. (0.157 equivalents) polycaprolactone having an average molecular weight of about 830, a hydroxyl number of about 135 and being formed by the reaction of epsiloncaprolactone and a diol, (Union Carbide D–520) and 144.9 g. xylene. All reactants were soluble and the reaction mixture was heated to 80° C. for 16 hours then cooled to room temperature. The percent NCO was determined and found to be 1.7% (theory 1.8%). The prepolymer was clear and contained no gel particles.

Coatings were prepared from this prepolymer, after diluting it to 40% solids with xylene, and tested in the manner described in Example 1. The results of the tests are provided in Table I below.

TABLE I
[Physical properties of coatings]

| Example No.: | Film thickness | Tensile strength, lbs./sq. inch | Elongation, percent | ⅛″ conical mandrel flexibility test, —65° F. |
|---|---|---|---|---|
| 1 | 1.95 | 5,334 | 345 | Passed. |
| 2 | 2.5 | 4,617 | 243 | Do. |

What is claimed is:
1. A coating composition consisting essentially of:
(a) an isocyanate-terminated urethane prepolymer prepared by reacting an organic polyisocyanate with a polyhydroxy compound,
(b) an addition product of
(i) a substituted isocyanurate of the formula

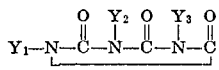

wherein each $Y_1$, $Y_2$ and $Y_3$ is independently an alkyl group having 1 to 8 carbon atoms and terminally substituted with OH, SH, or $NH_2$, and
(ii) per each mole of said substituted isocyanurate a proportion of at least one mole of a lactone having the formula

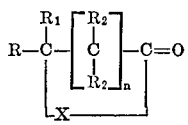

wherein each R, $R_1$, $R_2$ and $R_3$ is independently hydrogen,
or an alkyl group having 1 to 8 carbon atoms
$n$ is an integer from 1 to 6, and
X is oxygen or sulfur,
the proportion of said addition product being such as to provide a ratio, of NCO groups to total OH groups in said coating composition, ranging from about 1.1:1 to about 2.2.:1, said reaction product being formed at a temperature of from about 20° to about 150° C., and said reaction product being dissolved in
(c) an inert organic solvent.

2. The coating composition of claim 1 wherein each of $Y_1$, $Y_2$ and $Y_3$ in said isocyanurate is terminally substituted with OH.
3. The coating composition of claim 1 wherein X in said lactone is oxygen.
4. The coating composition of claim 3 wherein each of $Y_1$, $Y_2$ and $Y_3$ in said isocyanurate is terminally substituted with OH.
5. The coating composition of claim 4 wherein said organic polyisocyanate is a diisocyanate.
6. The coating composition of claim 5 wherein each of $Y_1$, $Y_2$ and $Y_3$ in said isocyanurate is independently an alkyl group having 1 to 4 carbon atoms.
7. The coating composition of claim 6 wherein the proportion of said lactone ranges from about 1.5 to about 12 moles per each mole of said substituted isocyanurate.
8. The coating composition of claim 7 wherein said organic diisocyanate is toluene diisocyanate or methylene bis(cyclohexylisocyanate).
9. The coating composition of claim 7 wherein said lactone is caprolactone or β-propiolactone said isocyanurate is tris(2-hydroxyethyl)isocyanurate.
10. The coating composition of claim 9 wherein said solvent is xylene and said polyhydroxy compound is a polycaprolactone.

References Cited
UNITED STATES PATENTS

| | | | |
|---|---|---|---|
| 3,660,327 | 5/1972 | Loncrini et al. | 260—22 TN |
| 3,186,971 | 6/1965 | Hostettler et al. | 260—77.5 |
| 3,503,934 | 3/1970 | Chilvers | 260—75 |
| 3,678,011 | 7/1972 | Hino et al. | 260—75 NH |

DONALD E. CZAJA, Primary Examiner
H. S. COCKERAM, Assistant Examiner

U.S. Cl. X.R.
260—29.1 R, 30.4 N, 30.8 DS, 31.2 N, 32.6 N, 33.2 R, 33.8 UB, 77.5 AN, 77.5 AQ, 77.5 NC